US007058165B2

(12) United States Patent
Koskinen et al.

(10) Patent No.: US 7,058,165 B2
(45) Date of Patent: Jun. 6, 2006

(54) CHARGING IN A COMMUNICATION SYSTEM

(75) Inventors: Juha-Pekka Koskinen, Hameenlinna (FI); Juha Vallinen, Tampere (FI); Merja Hopeaharju, Kangasala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/450,609

(22) PCT Filed: Dec. 20, 2001

(86) PCT No.: PCT/IB01/02815

§ 371 (c)(1),
(2), (4) Date: Nov. 24, 2003

(87) PCT Pub. No.: WO02/052833

PCT Pub. Date: Jul. 4, 2002

(65) Prior Publication Data

US 2004/0101117 A1 May 27, 2004

(30) Foreign Application Priority Data

Dec. 22, 2000 (GB) .................................. 0031459.1

(51) Int. Cl.
*H04M 15/00* (2006.01)
*H04M 11/00* (2006.01)

(52) U.S. Cl. .................... 379/115.03; 379/114.01; 379/114.03; 379/114.22; 379/115.01; 455/406; 455/408

(58) Field of Classification Search .......... 379/114.01, 379/114.03, 114.21, 114.22, 114.23, 115.01, 379/115.03, 121.01, 125, 127.01, 114.28, 379/114.29, 116, 121.05, 121.06, 126, 127.04, 379/133, 134; 455/405, 406, 407, 408

See application file for complete search history.

(56) References Cited

U.S. PATENT DOCUMENTS 5,381,467 A     1/1995   Rosinski et al.
5,978,456 A  *  11/1999  Takeuchi et al. ............ 379/131

(Continued)

FOREIGN PATENT DOCUMENTS

EP      1 014 619 A1    6/2000

(Continued)

*Primary Examiner*—Quoc Tran
(74) *Attorney, Agent, or Firm*—Squire, Sanders & Dempsey L.L.P.

(57) ABSTRACT

A method for charging for services in a communication system comprising a charging entity and at least two connection support entities for providing resources to support connection in the communication system. the method comprising: detecting initiation of a connection for provision by the connection support entities; generating a charging identity for identifying the connection: determining according to a first stored tariff a first charge for the support of the connection by the first connection support entity: determining according to a second stored tariff a second charge for the support of the connection by the second connection support entity; transmitting a first charging message from the first connection support entity to the charging entity. the message specifying the first charge and including the charging identity; and transmitting a second charging message from the second connection support entity to the charging entity, the message specifying the second charge and including the charging identity.

23 Claims, 2 Drawing Sheets

U.S. PATENT DOCUMENTS

| | | | | |
|---|---|---|---|---|
| 5,991,375 A * | 11/1999 | Stahl et al. | ............ | 379/112.05 |
| 6,038,439 A * | 3/2000 | Rune | ............ | 455/406 |
| 6,298,127 B1 * | 10/2001 | Petrunka | ............ | 379/126 |
| 6,307,924 B1 * | 10/2001 | Rosenberg | ............ | 379/115.01 |
| 6,345,182 B1 * | 2/2002 | Fabritius et al. | ............ | 455/408 |
| 6,442,257 B1 * | 8/2002 | Gundlach | ............ | 379/114.01 |
| 6,754,320 B1 * | 6/2004 | Daase et al. | ............ | 379/121.01 |
| 6,847,707 B1 * | 1/2005 | Suda et al. | ............ | 379/114.01 |

FOREIGN PATENT DOCUMENTS

| | | |
|---|---|---|
| JP | 10-285304 | 10/1998 |
| WO | WO 95/22230 | 8/1995 |
| WO | WO 98/39910 | 9/1998 |
| WO | WO 99/00971 | 1/1999 |
| WO | 00/11859 | 8/1999 |
| WO | WO 00/69201 | 11/2000 |
| WO | WO 01/91445 A1 | 11/2001 |

* cited by examiner

CHARGING IN A COMMUNICATION SYSTEM

This invention relates to charging for services in a communication system such as a mobile telephony system.

In a basic communication system a simple communication network is provided, which can link together two communication terminals so that the terminals can communicate with each other in a communication session or call. Conventionally, a designated entity in the network uses a stored tariff to determine a charge for a call based on the call's duration. Each terminal user has a charging account with the operator of the network. The charge for a call is then allocated to the charging account of the user of the terminal that originated the call. When a call is in progress the network may use the tariff to estimate the charge due in respect of the call so far. The network may periodically transmit that estimated charge to the terminal that originated the call, and the estimated charge may then be displayed by that terminal so that its user can see the ongoing cost of the call.

Pre-paid communication accounts are becoming increasingly popular. Under a pr-epaid account scheme a user pays in advance for communication services. As the user makes use of services the charges for those services are deducted from the balance of the user's account until the balance has diminished to zero. Then the network blocks the usage of services by the user until the account has been topped up. Pre-paid services have the advantage that the network operator does not need to trust the user to pay in arrears for services. However, in order to successfully implement a pre-paid system the operator's network must be able to stop the user using services when the balance of his account falls to zero. In the basic communication system described above this can be achieved simply by the network estimating the charge for a call whilst it is in progress, comparing that charge with the remaining balance of the pre-paid account that is to be charged for the call and terminating the call if the charge exceeds the remaining balance.

In more complex communication systems, for example communication systems according to the UMTS (universal mobile telecommunications system) standard for third generation (3G) communication systems the systems of more than one operator may be used for carrying a call, and operators of all of those systems may be able to levy charges independently for the services the provide in supporting the call. However, a system of this sort would rely on the possibility of reliably applying to the correct account the charges made by a number of operators for a single call. Furthermore, if in a system of that sort the user who is to be charged for the call has a pre-paid account the network would have to be able to track the ongoing charge for a call as it was in progress even though the charges for the call derived from a number of operators. Otherwise, the call might be allowed to continue when its cost exceeded the user's pre-paid balance.

There is therefore a need to provide for enhanced charging capability in communication networks.

According to a first aspect of the present invention there is provided a method for charging for services in a communication system comprising a charging entity and at least two connection support entities for providing resources to support a connection in the communication system, the method comprising: detecting initiation of a connection for provision by the connection support entities; generating a charging identity for identifying the connection; determining according to a first stored tariff a first charge for the support of the connection by the first connection support entity; determining according to a second stored tariff a second charge for the support of the connection by the second connection support entity; transmitting a first charging message from the first connection support entity to the charging entity, the message specifying the first charge and including the charging identity; and transmitting a second charging message from the second connection support entity to the charging entity, the message specifying the second charge and including the charging identity.

Preferably at least one of the first and second charges is determined based on the duration of the connection. Preferably at least one of the first and second charges is determined based on the amount of data transmitted during the connection. Most preferably the connection supports the carrying of data in packet form and at least one of the first and second charges is determined based on the number of packets transmitted during the connection.

Suitably at least one of the first and second charges is of a fixed value.

Suitably each of the first and second connection support entities has a unique identity.

The step of generating the charging identity is preferably performed by one of the first and second connection support entities. There is preferably a step of transmitting the charging identity from the said one of the first and second connection support entities to the other of the connection support entities. Preferably each of the first and second connection support entities maintains a count of the charging identities it has generated, and the charging identity is formed by combining the unique identity of the entity that generates the charging identity and the next number in the count maintained by that entity.

The method preferably comprises the steps of: receiving at the charging entity the first and second charging messages; and determining that the first and second charging messages have the same charging identity and in response thereto summing the first and second charges to form a total charge for the connection. Preferably the method comprises allocating the total charge to a user account.

The method suitably comprises the steps of transmitting from the first connection support entity to the charging entity the unique identity of the first connection support entity; and transmitting from the second connection support entity to the charging entity the unique identity of the second connection support entity.

The method suitably comprises the steps of: transmitting from the first connection support entity to the charging entity the first stored tariff; and transmitting from the second connection support entity to the charging entity the second stored tariff. Preferably, during the connection the charging entity forms an estimate of the charge for the connection according to the first and second tariffs Preferably the estimate is transmitted to the initiator of the connection, and/or to a charging entity responsible for and/or associated with the initiator of the connection.

Preferably a charging unit of the system compares the said estimate with a pre-paid balance of an account of the user who initiated the connection and if the balance is insufficient terminates the connection. The balance is suitably deeme; to be insufficient if it does not exceed the estimate by a predetermined amount. The predetermined amount may be zero.

According to a second aspect of the present invention there is provided a communication system comprising: at least two connection support entities for providing resources to support a connection in the communication system and arranged collectively to detect initiation of a connection for provision by the connection support entities; generate a charging identity for identifying the connection; and each to determine according to a respective stored tariff a respective charge for the support of the connection by the respective connection support entity and transmit to a charging entity a respective charging message to a charging entity, the message specifying the respective charge and including the charging identity; and a charging entity for receiving charging messages and summing charges specified by charging messages that include the same charging identity to form a total charge for a connection corresponding to that charging identity and causing the total charge to be allocated to a subscriber account.

The present invention will now be described by way of example with reference to the accompanying drawings, in which.

The present invention will be described by way of example with reference to the architecture of a 3G network. However, it will be understood that it can be applied to any other suitable form of network.

Figure 1:
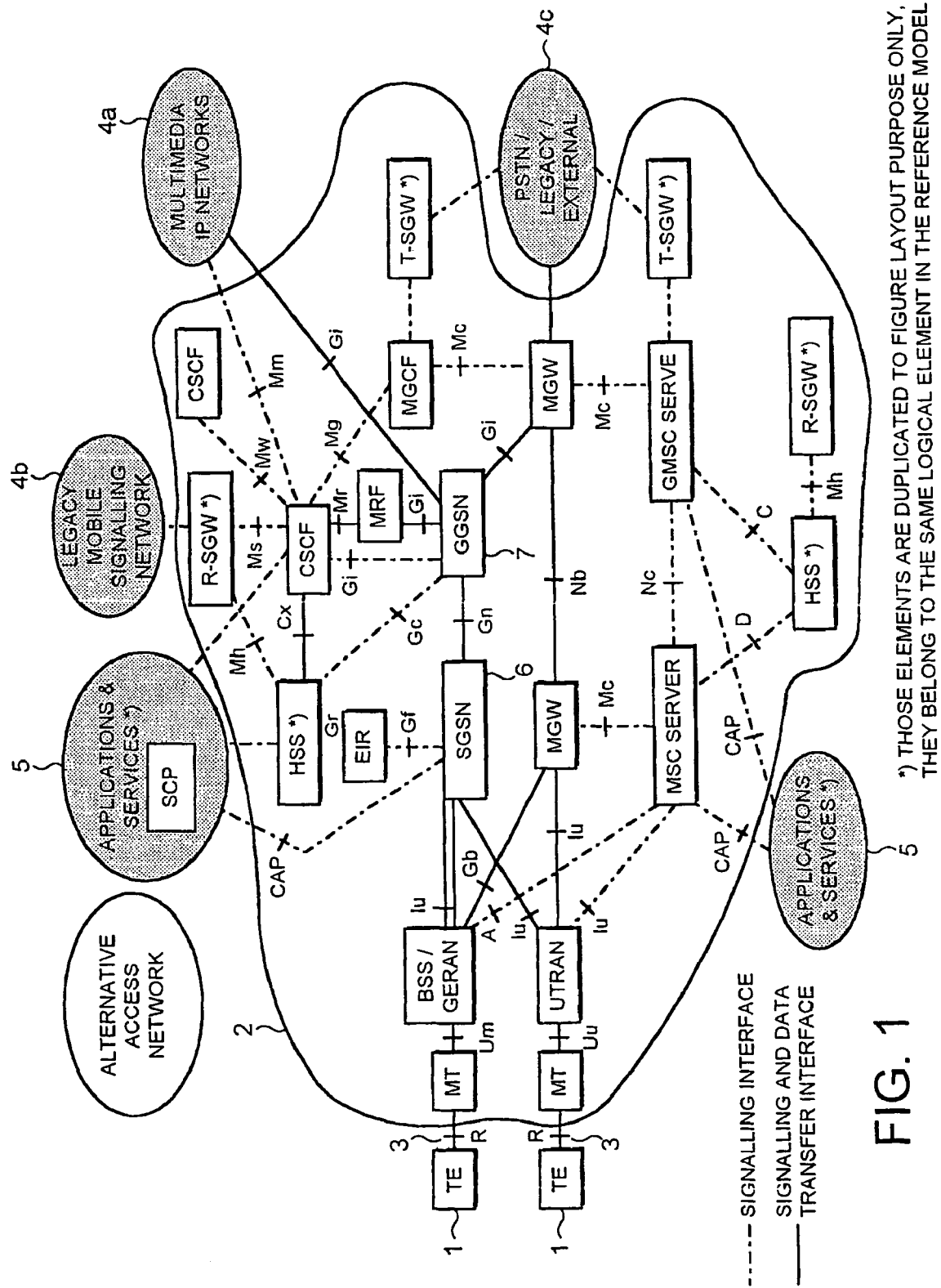
FIG. 1 is a schematic diagram of a communication network.

FIG. 1 depicts the architecture of an all-IP (internet protocol) UMTS communication system. Boxes and ellipses in FIG. 1 indicate network elements, which are annotated by their standard abbreviations. The network elements are connected by interfaces indicated by lines, whose types are indicated by their standard abbreviations next to the lines. Network elements whose abbreviations carry the suffix "*)" in FIG. 1 are duplicated in the figure for ease of layout, but belong to the same logical element in the UMTS reference model.

In the system of FIG. 1, items of terminal equipment (TE) 1 can communicate with the UMTS network 2 via radio (R) interface 3. By this means the TEs can communicate with other TEs that are connected directly to the UMTS network or are connected to other networks 4 that are connected to the UMTS network. The TEs can also receive applications and services from application/service platform 5.

In the system of FIG. 1 it is anticipated that charging control information for generating charges for separate services provided to support a connection or call could be generated from a number of entities:
1. The applications and services unit 5 (SCP or otherwise): for example to make a charge to a user for the use of a supplementary or value-added service (e.g. call forwarding, call transfer or recommendation of a restaurant local to the user).
2. The access network (the SGSN 6 or GGSN 7): for provision to the user of access for his terminal to the UMTS network.
3. The multimedia IP network (4a): for provision of access to that network and/or for access to specific data from the network and optionally for guarantees of quality of service In the network.
4. Legacy networks such as legacy mobile communication network 4b and legacy PSTN network 4c: for provision of access to those networks.
5. Core network (CPS—a physical element which includes the CSCF and optionally the MGCF too): for use of the UMTS core network for transfer of data.

The present application describes a means to combine charges provided from such a plurality of sources and also to permit pre-paid subscriptions to be supported. The charging means described herein makes use of charging data records (CDR) which are generated in the entities that levy charges and allow the charging control information to be passed in a coherent way. There are several forms of CDR, depending on the unit that generates the CDR. However, all the CDRs include a global charging identifier (charging ID) which allows the CDRs that have been generated in response to a single communication to be matched up.

Some specific examples of CDRs will now be described.

Table 1 shows the structure of a C-CDR, which is the form of CDR generated by the UMTS CPS 8. This CDR is generated when there has been point-to-point transaction. The CDR comprises a series of fields each of which has a component type.

TABLE 1

C-CDR

| Field | Component Type | Description |
| --- | --- | --- |
| Record Type | BI | CPS transaction type |
| Local Record Sequence Number | BI | Consecutive record number created by this node. The number is allocated sequentially including all CDR types. |
| Charging ID | BI | PDP context identifier used to identify this PDP context in different records created by CPS. |
| Record Length | BI | Length of the record |
| User ID | BI | Served party LN/MSISDN |
| User IMSI | BI | Served party IMSI |
| Cause for Record Closing | BI | The reason for the release of record from this CPS. |
| Record Sequence Number | BI | Partial record sequence number in this CPS. Only present in case of partial records. |
| Partial Indicator | BI | Identify the type of partial record (last) |
| CPS address | BI | The IP address of the CPS |
| Originating NE Address | UIO | The address of originating side network element |
| Connected ID | UIT | Connected party LN/MSISDN |
| Terminating NE Address | UIT | The address of terminating side network element |
| Access Time | TI | Time stamp when PDP context activation is created in this CPS. In intermediate charging this is not updated. |
| Opening time | TI | Record opening time. |
| Closing Time | TI | Record closing time. |
| Duration | TI | Duration of this record in the CPS. |
| Uplink Data Volume | TDI | Amount of transferred data (uplink) |
| Downlink Data Volume | TDI | Amount of transferred data (downlink) |
| QoS | TDI | Quality of Service required/accepted |
| Shared Charging | CI | Type of shared charging. If not used value is "Normal Charging" |
| Shared Percentage | CI | Amount of fee charged from subscriber "User ID" |
| Received Pulses | | Pulses received from network |

Table 2 shows the structure of an SE-CDR, which is the form of CDR generated by the application/services platform 5 for the provision of supplementary services. This CDR also records the corresponding amount of chargeable signalling usage).

TABLE 2

SE-CDR

| Field | Component Type | Description |
|---|---|---|
| Record Type | BI | CPS transaction type |
| Local Record Sequence Number | BI | Consecutive record number created by this node. The number is allocated sequentially including all CDR types. |
| Charging ID | BI | PDP context identifier used to identify this PDP context in different records created by CPS. |
| Record Length | BI | Length of the record |
| User ID | BI | Served party LN/MSISDN |
| User IMSI | BI | Served party IMSI |
| Cause for Record Closing | BI | The reason for the release of record from this CPS. |
| Record Sequence Number | BI | Partial record sequence number in this CPS. Only present in case of partial records. |
| Partial Indicator | BI | Identify the type of partial record (last) |
| CPS address | BI | The IP address of the CPS |
| Served Time | SI | Service usage time |
| Service Code | SI | Used service |

The fields in the CDRs are as follows:

Record Type

Identifies the type of CDR and the direction (in terms of origination and termination) of the communication that gave rise to it. Examples of record types are listed in table 3.

TABLE 3

Examples of record types

| Record Type Code | Description |
|---|---|
| 01 | IP originated transaction (GPRS or other CPS) |
| 02 | IP terminated transaction (GPRS or other CPS) |
| 03 | PSTN originated transaction (Including GSM) |
| 04 | PSTN terminated transaction (Including GSM) |
| 05 | Camel originated transaction |
| 06 | Camel terminated transaction |
| 07 | FORW (For forwarding subscriber) |
| 08 | ROAM (For roaming subscriber) |
| 09 | Service CDR (SE-CDR) |
| 10 | For future use |
| 11 | For future use |

Local Record Sequence Number

The consecutive record number of the CDRs created in the item of network equipment that generated this CDR.

Charging ID

The global charging ID. This is created, as described in more detail below, in for example the SGSN or CPS or another network element.

Record Length

Length of the CDR in bytes

User ID

Served party identification. The format of the field depends on the type of transaction.

User IMSI

Served party IMSI

Cause for Record Closing

The reason for record closing. If intermediate charging occurs this indicates the reason of the intermediate charging.

Received Pulses

Pulses received from the network (ISUP).

Record Sequence Number

Partial record sequence number. Only present in case of partial records.

Partial Indicator

Identify the type of partial record (partial, last partial)

CPS Address

The IP address of the CPS.

Originating NE Address

The address of originating side network element. This depends on the type of transaction.

Connected ID

Connected party identification. This depends on the type of transaction.

Terminating NE Address

The address of terminating side network element. This depends on the type of transaction.

Access Time

Timestamp when the PDP context has been activated. In case of intermediate charging this remains the same during whole transaction.

Opening Time

Timestamp when the record has been opened.

Closing Time

Timestamp when the record has been closed.

Duration

The duration of the transaction.

Uplink Data Volume

Amount of transferred data uplink.

Downlink Data Volume

Amount of transferred data downlink.

QoS

Quality of service required/accepted

Served Time

Timestamp when service has been used

Service Code

Identifies which service has been used. Signaling could be one of the chargeable services (case by case)

Shared Charging

Type of shared charging.

Shared Percentage

Amount of fee charged from user identified in field "User ID"

The component types of the CDRs are listed in table 4.

TABLE 4

CDR component types

| Component type | Description |
|---|---|
| BI | Basic information |
| UIO | User information originating - information relating to the user that originated the connection |
| UIT | User information terminating - information relating to the user that terminated the connection |
| TI | Time information - information relating to the time and temporal duration of the connection |

TABLE 4-continued

CDR component types

| Component type | Description |
|---|---|
| TDI | Transferred data information - information relating to the amount of data transferred during the connection |
| CI | Charging information - information relating to the charging structure for the connection |
| SI | Service information - information relating to the service(s) used in the connection |

Other CDRs may be formed in a like way to those described above.

The operation of charging using such CDRs will now be described.

The global charging ID provides a unique identifier for each connection/call. Each CDR includes a global charging ID field which includes the global charging ID of the call to which the information in it relates.

The first unit to generate a CDR or to begin charging for a call preferably generates the global charging ID for the call. One means by which this may be achieved is for each network unit that can generate global charging IDs to have an identity, for example in the form of an identity number, that is unique in the sense that no other unit that can generate CDRs has the same identity. Then each network unit that can generate global charging IDs also keeps a count, for example as an integer, of the global charging IDs that it issues. When the unit needs to form a global charging ID it combines its own identity number with the latest count number (e.g. by concatenating those numbers together) to produce the global charging ID and increments the count by one. For example, if the unique ID of the unit is 934521 and its count of global charging IDs it has issued is 324632 then the next global charging ID it would issue would be 934521324632 and the one after that (following incrementation of the count) would be 934521324633. The unique ID of the unit could be its network identity or its IP address or could be formed from either or both of those. The count is suitably 32 bits (4 bytes) long.

Alternatively the global charging ID may be generated centrally: a unit requiring a new global charging ID could request it from a global charging ID server.

Once a global charging ID has been generated in relation to a call that same global charging ID is used by all the entities that generate charges for the call, being included as the charging ID field of each of their CDRs for the call. To allow this to happen the first unit to generate a CDR or to begin charging for a call—i.e. the unit that generated the charging ID or requested it from the server—causes the charging ID to be made available to the other entities that may need to generate CDRs for the call. This is preferably done by transfer of the charging ID over the protocols used between the entities, for example the SIP and GTP protocols in UMTS. This may require the addition of an element to such protocols as they are presently formed, including the protocols that are used for communication with legacy networks such as GSM networks that may also need to generate CDRs. However, support for this feature allows the unit that generates or first acquires the charging ID pushes it to the other entities that may need to generate CDRs for the call.

Figure 2:
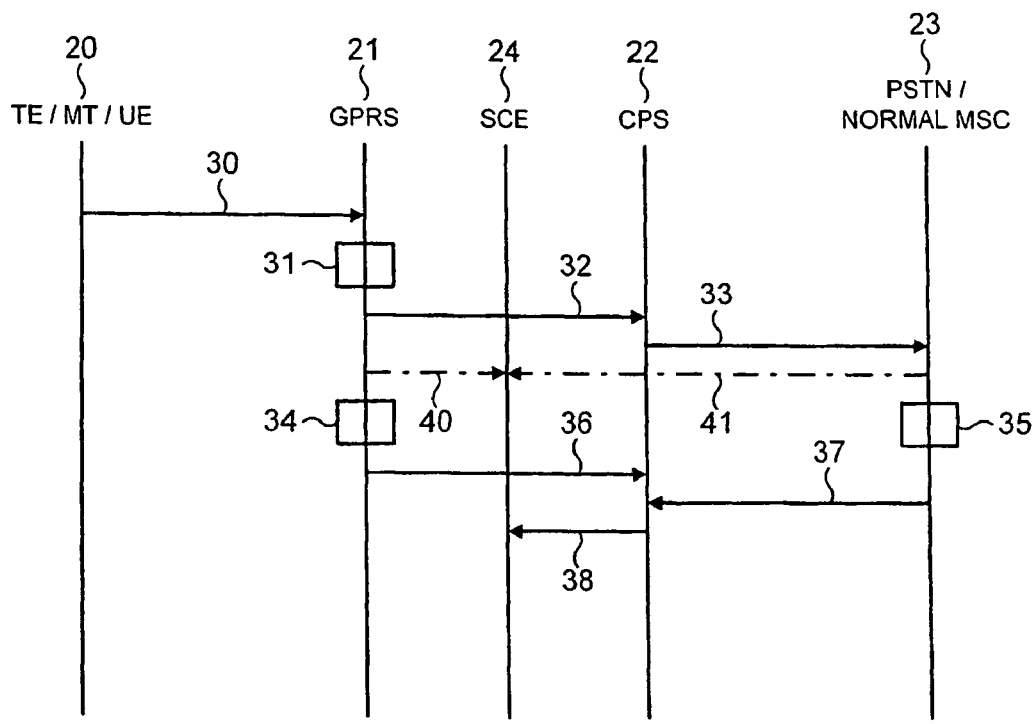
FIGS. 2 and 3 show communications for charging operations in the network of FIG. 1.

FIG. 2 illustrates an example of the system in operation. In FIG. 2, unit 20 is a mobile station or item of user or terminal equipment, unit 21 is the charging generation unit of a GPRS network, unit 22 is the CPS 8 of a UMTS network, unit 23 is the charging generation unit of a PSTN network or the MSC of a GSM network, and unit 24 is the SCE of the UMTS network.

When a call is to be made from TE 20 via the GPRS system to a terminal of the PSTN 23 the call first reaches the GPRS system (step 30), which recognises that it has no global charging ID for the call and therefore generates one according to the method described above (step 31). In passing the call to the core network of the UMTS system the GPRS system passes the global charging ID it has generated for the call (step 32). In passing the call to the PSTN the core network of the UMTS system passes the global charging ID it has received for the call (step 33). When the call is complete the entities that need to generate charges for the call each generate CDRs that include the global charging ID of the call. These are sent to a central point, preferably the charging entity of the home network of the user of the TE 20, where that user's account is homed. In this example that is assumed to be the UMTS network. Therefore, the entities 21 and 23 generate CDRs (steps 34, 35) and send them to the unit 22 (steps 36, 37). The unit 22 sends those CDRs when it receives them to the charging entity 24 (step 38). The unit 22 also generates a CDR itself, which it sends to the charging entity 24. Even if the CDRs arrive at the charging entity 24 at different times the charging entity can match them up because they include the same global charging ID.

When the charging entity receives a CDR it checks whether it has previously received a CDR having the same global charging ID as the newly received CDR. If it has not it forms a new transaction on the account of the user to whom the newly received CDR indicates a charge should be made, the transaction initially having the value indicated in the CDR. When any more CDRs having the same global charging ID are received their value is added to the same transaction. The total value of the transaction is debited from the user's account. The transaction may be debited from the user's account as a single item so that the charges derived from different sources for a single call are transparent to the user. The transaction may be itemised so that the user can see how the total charge is made up.

Alternatively, the CPS 22 could collect and match up the CDRs and send a single totalised indication of the transaction to the SCE 24.

The elements of the network that generate charges and that modify or use charging information support the transfer of charging information elements (CIEs). CIEs describe the basis that is to be used for charging of a call and the information they carry allows the total or itemised charge for a call to be estimated whilst the call is in progress and before CDRs have been generated. Information in a CIE has two general purposes: providing a user with advice of charge (mobile charging part—MCP) and providing network elements with a specification of how charges are to be levied (network charging part—NCP). Different CIEs may be used for these purposes, but for simplicity and compatibility preferably a unified form of CIE is used.

Table 4 shows the form of an example CIE.

TABLE 4

Form of CIE

| Field description | NCP ? | MCP ? |
|---|---|---|
| Tariff currency (ETSI ISUP) - used as described in ES 201 296 | Yes | Yes |

TABLE 4-continued

Form of CIE

| Field description | NCP ? | MCP ? |
|---|---|---|
| Units per time interval - defines how many currency units are charged per time interval defined in the time interval field | Yes | Yes |
| Time interval - defines the time interval used as the basis for charging | Yes | Yes |
| Switchover time (ETSI ISUP) - used as described in ES 201 296 | Yes | |
| Shared charging information - describes the type of fee sharing to be used | Yes | |
| Shared charging percentage - describes the percentage that the service provider is willing to pay according to the shared charging information field | Yes | |
| Call attempt charge (ETSI ISUP) - used as described in ES 201 296 | Yes | |
| Call set-up charge (ETSI ISUP) - used as described in ES 201 296 | Yes | |
| Quality of service - describes the quality of service | Yes | |
| Global charging ID - indicates the unique reference described above | Yes | |
| Pre-paid information - indicates a pre-paid threshold value for the subscriber, which could be network-dependent | Yes | |

Preferably when a call is set up each of the entities that will make a charge for the call generates a CIE of this form and transmits it to the charging entity of the user's home network, where the call-originating user's account is homed (transmission steps 40, 41 and (not shown) transmission from unit 22 to unit 24 in FIG. 2). This allows that unit to estimate the itemised and total charges that will be levied for the call by all those entities. The CIEs can, as for the CDRs be matched up on the basis of the global charging ID, which all CIEs for a single call have in common.

If the user requests advice of charge during a call then CIEs may be sent to the user's terminal from all the entities that will make a charge for the call. Alternatively, the charging entity for the user's home network may form a CIE summing the charges from the CIEs from the charging entities and send that to the user's terminal. The CIE(s) sent to the user's terminal could include only the MCP fields, whereas the CIEs sent to the charging entity should include all the NCP fields.

Since the charging entity for the user's home network can, using the CIEs, estimate the total charges that will be levied for a call the CIEs provide a means whereby prepaid accounts may be supported under a charging structure of the type described herein. If the user who originated the call has a pre-paid account then the operator with whom the user has his account will wish to terminate a call whilst it is in progress if it would otherwise result in the user's account having no remaining credit.

As a call progresses the charging entity periodically estimates the charge for the call so far using the CIEs received for the call. This may be done, for example, every second or every five seconds, depending on the load on the charging entity. The charging entity compares that estimated charge with the balance of the account to which the call will be charged. The operator causes the call to be ended it the estimated charge exceeds the balance, or—to take account of potential errors in the estimation—if the estimated charge is not greater than the balance by a predetemined threshold. To do this the charging entity should have knowledge of or should be able to estimate the call-dependant factors, such as the duration of the call or the amount of data transferred during the call, that may have an impact on the charge. These may be transmitted periodically to the entity by at least one of the entities involved in carrying the call, for example unit 22 in FIG. 2. Alternatively, they may be estimated by the charging entity from a knowledge of the time when the call began (e.g. approximately the time at which the CIEs for the call were received by the charging entity), the present time, and (if needed) an average data transmission rate. The duration of the call may be estimated by subtracting the time. at which the call began from the present time. The amount of data transmitted may be estimated by multiplying the duration of the call by the expected data rate.

The principle of shared charging enables operators and/or the terminating user to co-operate to share or distribute the charges for a call. In conventional charging the user responsible for originating the call bears the full cost of the call. Under a shared charging regime the user of the terminating part may bear part of the cost, either voluntarily or under requirement from an operator. The type of shared charging may be indicated by a code according to table 5.

| Shared charging code | Description |
|---|---|
| 00 | Normal charging - Charges not shared. Used when the user of the terminating part is not to bear any of the cost of the call. The originating subscriber is charged for the full cost of the call. |
| 01 | Network access fee - Indicates that the user of the terminating part will bear part or all of the network access charge. |
| 02 | Transferred data towards used service - Indicates that the user of the terminating part will bear part or all of the cost of transferring data towards a used service. |
| 03 | Used service - Indicates that the user of the terminating part will bear part or all of the cost of a used service. |
| 04 | CallControl and MobilityManagement - Indicates that the user of the terminating part will bear part or all of the charge due to call routing and mobility management (due to the CallProcessing server). |
| 05 | Total cost of transaction excluding other services' fees - Indicates that the user of the terminating part will bear a proportion of the total charge of the call excluding the charge for the use of supplementary/value-added services. |
| 06 | Total cost of transaction - Indicates that the user of the terminating part will bear a proportion of the total charge of the call. |

Other types of shared charging may be used in addition to or instead of those listed above.

When a call is set up and shared charging is in use the entities that will generate charges for the call determine whether any of the charges for the call will be shared, for example by checking their own network policies and any preferences for the user of the part that terminates the call. Based on that determination they determine which shared charging code applies to the call. That shared charging code is included in the shared charging information field of the CIE that they generate, and the percentage (from 0% to 100%) of the appropriate charge (as indicated by that code) that will be borne by the terminating party is indicated in the shared charging percentage field. By this means the impact of shared charging can be taken into account if the charging entity of the originating party's network needs to estimate the charge for the connection. Provided the sharing is of services provided by the network that is home to the terminating party that network can also estimate the charge that will be due to the terminating party and therefore support the situation where the terminating party has a pre-paid account; otherwise copy CIDs indicating the basis for other charges due to the terminating party must also be transmitted to the terminating party's charging entity.

If more than one CIE for a call indicates the same shared charging value then they are settled by the charging entity of the originating party according to the following priority:
1. The order in which they were received by that charging entity.
2. Calculating the fee from the original cost. When the remaining part of the corresponding charge is zero then further shared charging indications are deemed invalid.

If more than one CIE for a call indicates a different shared charging value then they are settled by the charging entity of the originating party according to the following priority:
1. Charging types 01 to 04 as indicated above are handled first.
2. Charging type 05 as indicated above is handled thereafter.
3. Charging type 06 as indicated above is handled thereafter.

Figure 3:
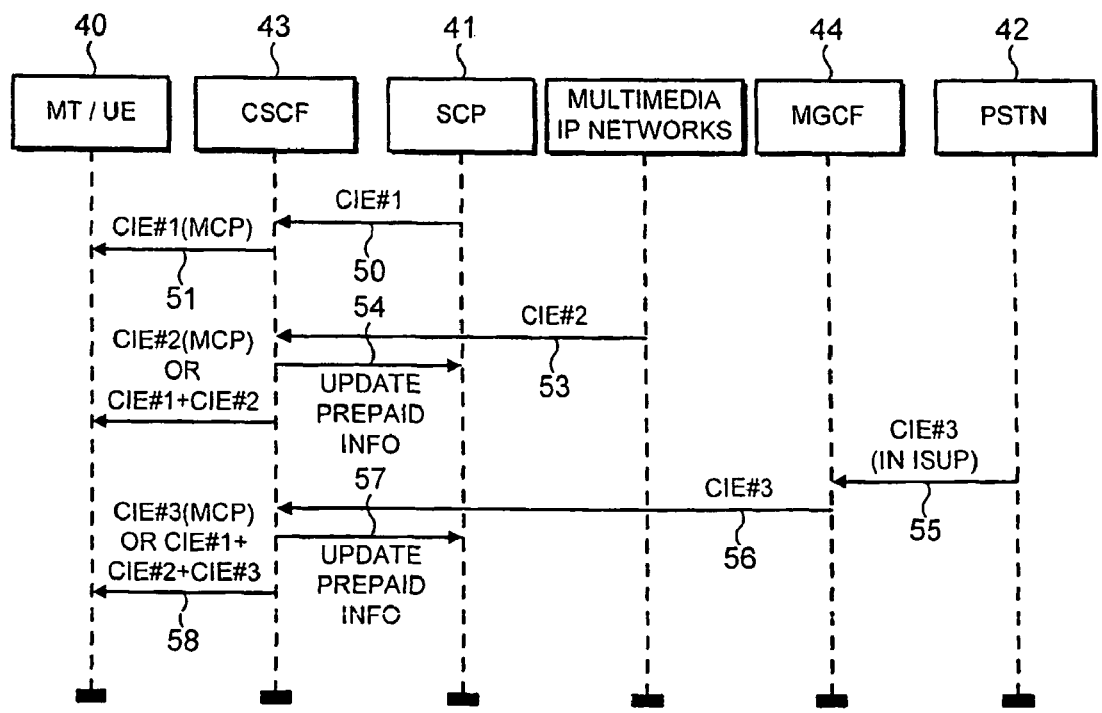

FIG. 3 illustrates an example of shared charging in action. In the scenario illustrated in FIG. 3 a subscriber A of mobile terminal/user equipment (MT/UE) 40 accesses a UMTS MIPT (mobile internet protocol telephony) network via a GPRS network. Subscriber A has activated services which are handled by the SCP 41 of the MIPT network. SCP 41 includes the user's charging entity. The user also uses other internet-related services from multimedia IP network 44 before the actual call is routed and connected to the PSTN 42 that is its destination. The PSTN leads to the service number of the terminating terminal part (not shown in FIG. 3).

FIG. 3 illustrates the signalling using CIEs that may happen as the call is set up.

Signals 50, 51 illustrate the transmission of a first CIE: CIE#1. This CIE indicates the basic tariff to the subscriber of the MT/UE 40 for the call (including tariff currency, units per time interval and time interval). CIE#1 is transmitted from the SCP to the CSCF 43 and then the MCP parts of the CIE are passed on to the MT/UE 40.

As the call progresses network 44 indicates that it will make a charge for the use of services by transmitting CIE#2 to CSCF 43 (signal 52). CIE#2 indicates the levying of a one-off charge (in the form of a call set-up charge) for the use of a service. CSCF 43 forwards CIE#2 to SCP 41 (signal 53) so that it can take that CIE into account in estimating the ongoing cost of the call in case the user has a pre-paid subscription. CSCF 43 also informs the MT/UE 40 of the updated charging regime (signal 54). It does this either by forwarding the MCP information from CIE#2 to the MT/UE so that the MT/UE can add that to the information on CIE#1 that it has already received, or by summing the charging indicated by the MCP information of CIE#1 and CIE#2 and sending a CIE indicating that summed charging to the MT/UE to supersede the previously sent information.

Then PSTN 42 indicates via MGCF 44 (signals 55, 56) that it will make a charge as indicated in CIE#3. This is a charge part of which will be shared with the terminating user. CSCF 43 forwards CIE#3 to SCP 41 (signal 57) so that it can take that CIE into account in estimating the ongoing cost of the call in case the user has a pre-paid subscription. CSCF 43 also informs the MT/UE 40 of the updated charging regime (signal 58), either by forwarding the MCP information from CIE#3 or by forwarding a superseding summed CIE.

Charging information is preferably considered separately in determining whether, for a pre-paid user, individual services may be accessed or individual calls maintained.

In general, the protocols that are used between charge-generating network elements and between network elements that modify charging information should support transfer of the charging ID.

The present invention has been described with specific reference to the UMTS and GPRS systems. However, it is not limited to these systems.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method for charging for services in a communication system comprising a charging entity and at least two connection support entities for providing resources to support a connection in the communication system, the method comprising:
   detecting initiation of a connection for provision by the connection support entities;
   generating a charging identity at a first one of the connection support entities for identifying the connection to the at least two connection support entities;
   determining according to a first stored tariff a first charge for the support of the connection by the first connection support entity;
   determining according to a second stored tariff a second charge for the support of the connection by the second connection support entity;
   transmitting a first charging message from the first connection support entity to the charging entity, the message specifying the first charge and including the charging identity; and
   transmitting a second charging message from the second connection support entity to the charging entity, the message specifying the second charge and including the charging identity.

2. A method as claimed in claim 1, wherein at least one of the first and second charges is determined based on the duration of the connection.

3. A method as claimed in claim 1, wherein at least one of the first and second charges is determined based on the amount of data transmitted during the connection.

4. A method as claimed in claim 3, wherein the connection supports the carrying of data in packet form and at least one of the first and second charges is determined based on the number of packets transmitted during the connection.

5. A method as claimed in claim 1, wherein at least one of the first and second charges is of a fixed value.

6. A method as claimed in claim 1, wherein each of the first and second connection support entities has a unique identity.

7. A method as claimed in claim 1, comprising the step of transmitting the charging identity from the connection support entity to the other of the connection support entities.

8. A method as claimed in claim 1, wherein each of the connection support entities maintains a count of the charging identities it has generated, and the charging identity is formed by combining the unique identity of the entity that generates the charging identity and the next number in the count maintained by that entity.

9. A method as claimed in claim 1, comprising the steps of:
receiving at the charging entity the first and second charging message; and
determining that the first and second charging messages have the same charging identity and in response thereto summing the first and second charges to form a total charge for the connection.

10. A method as claimed in claim 9, comprising allocating the total charge to a user account.

11. A method as claimed in claim 9, comprising dividing the total charge into at least two portions and allocating one of those portions to a first user account and the second of those portions to another user account.

12. A method as claimed in claim 11, wherein the first user account is associated with a terminal that initiated the connection.

13. A method as claimed in claim 11, wherein the second user account is associated with another terminal to which the terminal that initiated the connection has been connected by means of the connection.

14. A method as claimed in claim 12, wherein the second user account is unassociated with another terminal to which the terminal that initiated the connection has been connected by means of the connection.

15. A method as claimed in claim 6, comprising the steps of:
transmitting from the first connection support entity to the charging entity the unique identity of the first connection support entity; and
transmitting from the second connection support entity to the charging entity the unique identity of the second connection support entity.

16. A method as claimed in claim 1, comprising the steps of:
transmitting from the first connection support entity to the charging entity the first stored tariff; and
transmitting from the second connection support entity to the charging entity the second stored tariff.

17. A method as claimed in claim 16, wherein during the connection the charging entity forms an estimate of the charge for the connection according to the first and second tariffs.

18. A communication system comprising:
at least two connection support entities for providing resources to support a connection in the communication system and arranged collectively to detect initiation of a connection for provision by the connection support entities; generate a charging identity at a first one of the connection support entities for identifying the connection to the at least two connection support entities; and each to determine according to a respective stored tariff a respective charge for the support of the connection by the respective connection support entity and transmit to a charging entity a respective charging message to a charging entity, the message specifying the respective charge and including the charging identity; and
a charging entity for receiving charging messages and summing charges specified by charging messages that include the same charging identity to form a total charge for a connection corresponding to that charging identity and causing the total charge to be allocated to a subscriber account.

19. A method for charging for services in a communication system capable of supporting communication between at least a first user terminal and a second user terminal, the communication system including:
a charging entity for attributing to an account associated with one of the terminals a charge for the use of services in supporting the communication; and
a plurality of communication support entities each capable of providing services to support the communication and to which payment for the provision of the respective services in supporting the communication is attributable;
the method comprising:
each communication support entity transmitting to the charging entity an indication of a respective charging calculation method;
the charging entity receiving and storing each indication of a charging calculation method together with an indication of the entity to which the indication relates;
establishing a communication link between the first user terminal and the second user terminal by means of services provided by a sub-set of the communication support entities; and
the charging entity performing the steps of: determining for each of the communication support entities of the sub-set a respective amount; attributing to each of the communication support entities of the sub-set a payment determined in dependence on the respective amount; and attributing to an account associated with one of the first user terminal and the second user terminal a charge determined in dependence on the sum of the determined amounts.

20. A method as claimed in claim 19, comprising:
determining a charge for a connection between a first terminal and a second terminal;
dividing the charge into at least two sub-charges; and
allocating one of those portions to a first user account and the second of those portions to another user account.

21. A method as claimed in claim 20, wherein the first user account is associated with a terminal that initiated the connection.

22. A method as claimed in claim 21, wherein the second user account is associated with another terminal to which the terminal that initiated the connection has been connected by means of the connection.

23. A method as claimed in claim 22, wherein the second user account is unassociated with another terminal to which the terminal that initiated the connection has been connected by means of the connection.

* * * * *